US009295973B2

(12) United States Patent
Fan et al.

(10) Patent No.: US 9,295,973 B2
(45) Date of Patent: Mar. 29, 2016

(54) $CO_2$ SEPARATION USING A SOLID K-FE SORBENT

(75) Inventors: Maohong Fan, Ames, IA (US); Bo-Tao Zhang, Beijing (CN); Alan E. Bland, Laramie, WY (US); Armistead Russell, Laramie, WY (US)

(73) Assignee: the University of Wyoming, Laramie, WY (US)

( * ) Notice: Subject to any disclaimer, the term of this patent is extended or adjusted under 35 U.S.C. 154(b) by 461 days.

(21) Appl. No.: 13/486,222

(22) Filed: Jun. 1, 2012

(65) Prior Publication Data

US 2013/0142718 A1 Jun. 6, 2013

Related U.S. Application Data

(60) Provisional application No. 61/492,066, filed on Jun. 1, 2011.

(51) Int. Cl.
| | |
|---|---|
| *B01J 20/04* | (2006.01) |
| *B01J 20/06* | (2006.01) |
| *B01D 53/62* | (2006.01) |
| *B01J 20/32* | (2006.01) |
| *B01J 20/02* | (2006.01) |

(52) U.S. Cl.
CPC ............... *B01J 20/06* (2013.01); *B01D 53/62* (2013.01); *B01J 20/0229* (2013.01); *B01J 20/043* (2013.01); *B01J 20/3204* (2013.01); *B01J 20/3236* (2013.01); *B01D 2251/306* (2013.01); *B01D 2251/606* (2013.01); *B01D 2257/504* (2013.01); *Y02C 10/04* (2013.01)

(58) Field of Classification Search
CPC .... B01J 20/0229; B01J 20/041; B01J 20/043; B01J 20/06; B01J 20/3236; B01J 20/3204; B01J 35/00; B01J 35/04; C01G 49/00; C01G 49/0027; C01G 49/0045; C01G 49/02; C01B 2210/0051; B01D 53/00; B01D 53/62; B01D 53/945; B01D 2257/504
USPC ............ 502/406; 423/231, 232, 244.1, 594.2; 422/171, 177, 180; 252/184
See application file for complete search history.

(56) References Cited

U.S. PATENT DOCUMENTS

2008/0119356 A1* 5/2008 Ryu et al. ................. 502/400
2008/0271601 A1* 11/2008 Schlegel et al. .............. 95/90

OTHER PUBLICATIONS

Abu-Zahra et al., "CO2 capture from power plants Part I. A parametric study of the technical performance based on monoethanolamine", "International Journal of Greenhouse Gas Control", 2007, pp. 37-46, vol. 1.
Balat et al., "Technical and Economic Aspects of Carbon Capture and Storage—A Review", 2007, vol. 25, No. 5.
Choi et al., "Adsorbent Materials for Carbon Dioxide Capture from Large Anthropogenic Point Sources", "ChemSusChem", 2009, pp. 796-854, vol. 2.
Intergovernmental Panel on Climate Change (IPCC), "Climate Change 2007: Synthesis Report (IPCC Fourth Assessment Report)", "http://www.ipcc.ch/publications_and_data/ar4/syr/en/main.html", 2010.

(Continued)

*Primary Examiner* — Colleen Dunn
(74) *Attorney, Agent, or Firm* — Davis, Brown, Koehn, Shors & Roberts, P.C.

(57) ABSTRACT

A sorbent for $CO_2$ wherein $K_2CO_3$ is supported on FeOOH.

4 Claims, 6 Drawing Sheets

(56) References Cited

OTHER PUBLICATIONS

Feng et al, "Screening of CO2 Adsorbing Materials for Zero Emission Power Generation Systems", "Energy & Fuels", 2007, pp. 426-434, vol. 21.

Hayashi et al., "Efficient Recovery of Carbon Dioxide from Flue Gases of Coal-Fired Power Plants by Cyclic Fixed-Bed Operations over K2CO3-on-Carbon", "Ind. Eng. Chem. Res.", 1998, pp. 185-191, vol. 37, No. 1.

Hirano et al., "Cyclic Fixed-Bed Operations over K2CO3-on-Carbon for the Recovery of Carbon Dioxide under Moist Conditions", "Bull Chem. Soc. Jpn", 195, pp. 1030-1035, vol. 68.

Kutzbach et al., "Climate model simulation of anthropogenic influence on greenhouse-induced climate change (early agriculture to modern): the role of ocean feedbacks", 2010, vol. 99, No. 351-381.

Lee et al., "Development of Regenerable MgO-based Sorbent Promoted with K2CO3 for CO2 Capture at Low Temperatures", "Environ. Sci. Technol.", 2008, pp. 2736-2741, vol. 42.

Lee et al., "Dry Potassium-Based Sorbents for CO2 Capture", "Catal Sury Asia", 2007, pp. 171-185, vol. 11.

Lee et al., "New Phase Transition at 155 K and Thermal Stability in KHCO3", "Phys. Soc. Jpn.", 2001, pp. 3581-3584, vol. 70, No. 12.

Lee et al., "Structure Effects of Potassium-Based TiO2 Sorbents on the CO2 Capture Capacity", "Top Catal", 2010, pp. 641-647, vol. 53.

Li et al., "Capture of CO2 from high humidity flue gas by vacuum swing adsorption with zeolite 13X", "Adsorption", 2008, pp. 415-422, vol. 14.

Okunev et al., "Sorption of Carbon Dioxide From Wet Gases by K2CO3-In-Porous Matrix: Influence of the Matrix Nature", "React Kinet Catal Lett", 2000, pp. 355-362, vol. 71, No. 2.

Olajire, Abass, "CO2 capture and separation technologies for end-of-pipe applications e A review", "Energy", 2010, pp. 2610-2628, vol. 35.

Sathitsuksanoh et al., "Immobilization of CO2 by aqueous K2CO3 using microfibrous media entrapped small particulates for battery and fuel cell applications", "Journal of Power Sources", 2007, pp. 478-486, vol. 173.

Sharonov et al., "Sorption of CO2 from Humid Gases on Potassium Carbonate Supported by Porous Matrix", "Russian Journal of Applied Chemistry", 2001, pp. 401-405, vol. 74, No. 3.

Tanaka, H., "Comparison of Thermal Properties and Kinetics of Decompositions of NaHCO3 and KHCO3", "Journal of Thermal Analysis", 1987, pp. 521-526, vol. 32.

World Meterological Organization, "Greenhouse Gas Bulletin: The State of Greenhouse Gases in the Atmosphere Based on Global Observations through 2009", "http://www.wmo.int/pages/prog/arep/gaw/ghg/GHGbulletin.html", 2010, No. 6.

Zhao et al, "Carbonation Behavior of K2CO3 with Different Microstructure Used as an Active Component of Dry Sorbents for CO2 Capture", "Ind. Eng. Chem. Res.", 2010, pp. 12212-12216, vol. 49.

Zhao et al, "CO2 Absorption Using Dry Potassium-Based Sorbents with Different Supports", "Energy Fuels", 2009, pp. 4683-4687, vol. 23.

Zhao et al, "Multiple-Cycles Behavior of K2CO3/Al2O3 for CO2 Capture in a Fluidized-Bed Reactor", "Energy Fuels", 2010, pp. 1009-1012, vol. 24.

International Energy Agency, "Carbon Capture and Storage: Full-scale Demonstration Progress Update", "http://www.ieaghg.org/index.php?/20091218110/what-is-css.html", 2010.

\* cited by examiner

CO₂ SEPARATION USING A SOLID K-FE SORBENT

This application claims priority to U.S. Patent Application Ser. No. 61/492,066, filed Jun. 1, 2011, and incorporates the same herein in its entirety by this reference.

BACKGROUND OF THE INVENTION

The invention relates generally to sorbents and, more specifically, to an inexpensive K—Fe-based sorbent developed using $K_2CO_3$ and nanoporous FeOOH.

People are increasingly concerned about the climate changes we have experienced; including the increases in global average air and ocean temperatures, rising sea levels, and widespread melting of ice caps and glaciers. Rising global temperatures could lead to many disasters including severe weather events, drought and flooding, and thus food supply shortfalls, lack of water security, deterioration of ecosystems, and spread of vector-borne diseases.

The main greenhouse gases associated with climate changes are carbon dioxide, methane, nitrous oxide and some halogenated compounds. The quantity of $CO_2$ emitted to the atmosphere due to human activities is much greater than those of other greenhouse gases. As a result, $CO_2$ makes the greatest contribution to the greenhouse effect despite its low unit globe warming potential. According to the latest analyses of the data from the global greenhouse gas monitoring network of World Meteorological Organization (WMO), the global concentration of $CO_2$ in the atmosphere reached a new high level in 2009, 386.8 ppm, which is ~38% higher than those in pre-industrial times.

Net $CO_2$ emission reductions could be achieved by reducing energy consumption through increasing energy conversion efficiency, switching to less carbon-intensive fuels, and using alternative fuels. However, fossil fuels, such as coal, oil and natural gas, are likely to continue to be used for meeting more than 80% of total world energy demand in the coming decades due to their high energy densities and wide availabilities. The capture and storage of carbon dioxide will be the major method to be used for limiting $CO_2$ emissions from the combustion of fossil fuels in this century.

A variety of methods, such as membrane separation, absorption with a solvent, and cryogenics techniques, have been used to separate $CO_2$ from flue gases and other waste gas streams. These methods, however, are energy-intensive. Regenerable solid sorbents containing inexpensive alkali metals and alkali earth metals have attracted many people's attention since they could be regenerated with the heat recovered from the waste gas streams including flue gas and thus could provide cost-effective approaches to removal of $CO_2$ from flue gas in power plants. A major challenge in developing solid $CO_2$ sorbents is to find new multifunctional supporting materials for alkali chemicals such as potassium carbonate. Several studies have been conducted on separation of $CO_2$ from the simulated flue gas steams with $K_2CO_3$ supported by $TiO_2$, $SiO_2$, CaO, MgO and different porous matrices such as activated carbon, silica gel, aluminum oxide, and vermiculite under cyclic fixed-bed operation conditions along with the presence of $H_2O$. However, nanoporous FeOOH has not been tested by others as a supporting material for synthesis of a solid $CO_2$ sorbent. In this research, a new K—Fe solid sorbent has been developed using low-price potassium carbonate and nanoporous multifunctional FeOOH. The performance of the K—Fe sorbent on $CO_2$ sorption and desorption was evaluated using a fixed bed reactor under different operation conditions, and the associated sorption and desorption mechanism, thermodynamics as well as kinetics were investigated.

SUMMARY OF THE INVENTION

An inexpensive K—Fe-based sorbent was developed using potassium carbonate ($K_2CO_3$) and nanoporous FeOOH. Its $CO_2$ separation performance was investigated in a fixed bed tube reactor under different conditions. The K—Fe sorbent can increase $CO_2$ capture capacity by more than seventy times compared to pure solid potassium carbonate powder. The sorption capability of K—Fe sorbent reaches its peak when the content of $K_2CO_3$ in sorbent is 33.33% under the tested sorption conditions. The $CO_2$ sorption capacity of the sorbent increases with the increase of moisture in gas but it decreases dramatically with the elevation of sorption temperature. The total $CO_2$ capture capability of the K—Fe sorbent is ~49 mg $CO_2$/g-sorbent at 60° C. within 10 vol-% moisture environment. The sorbent is regenerable and its multicycle sorption capability stays at approximately 30 mg $CO_2$/g sorbent when regeneration temperature is 125° C. Catalysis plays an important role in improving $CO_2$ desorption and thus reduces the energy consumption required for $CO_2$ separation technology.

DETAILED DESCRIPTION OF PREFERRED EMBODIMENTS

I. Materials and Methods

A. Reagent and Materials

All the reagents used in these experiments were of analytical or higher grade without further purification. Potassium carbonate was purchased from VWR International, LLC. (West Chester, Pa.). 4-20 mesh calcium chloride pellets were obtained from Fisher Scientific Inc. (Fair Lawn, N.J.). Nanoporous FeOOH was provided by Kemira Water Solution, Inc. (Bartow, Fla.). Deionized (DI) water was used for preparation of all the sorbents tested in this research.

B. Sorbent preparation and Characterization

The first step of preparing the K—Fe sorbent was to add 10 g FeOOH to 50 mL potassium carbonate solution (10 wt-%), followed by stirring the mixture with a magnetic stirrer at room temperature for 24 hrs and drying it in a rotary vacuum evaporator at 70° C. The morphological characteristics of the supporting material (FeOOH) and the synthesized K—Fe sorbent were analyzed using a Hitachi TM-1000 tabletop scanning electron microscope (SEM). The powder X-ray diffractions (XRD) of the fresh and spent sorbent were evaluated by Philips X'Pert diffractometer using Cu-Kα as its radiation resource under the chosen operation conditions (voltage: 40 kV; current: 40 mA; start angle: 5; end angle, 95; step size: 0.02; time per step: 1.00; scan speed: 0.02).

C. $Co_2$ Sorption/Desorption Apparatus

Figure 1:
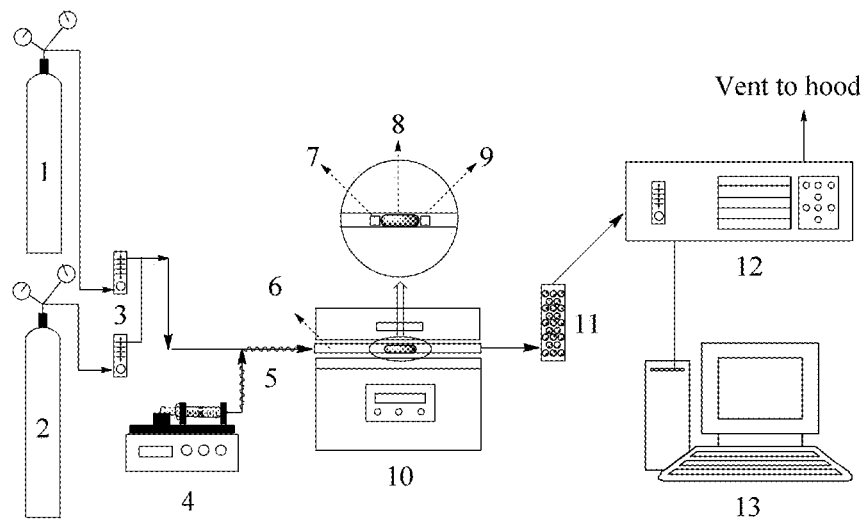
FIG. 1 is a schematic diagram of carbon dioxide separation setup (1: carbon dioxide cylinder; 2: nitrogen cylinder; 3: flow meter; 4: syringe pump; 5: heating tapes; 6: quartz tube reactor; 7: quartz wool; 8: sorbent; 9: quartz wool and notch block; 10: tube furnace; 11: water removal unit; 12: multi-gas analyzer; 13: data collection unit).

The experimental set-up used for separation of carbon dioxide during the research is illustrated in FIG. 1. Quarter inch Teflon tubing was used as the connection material in the flow system. Ultra high purity nitrogen 1 and carbon dioxide gas 2 (US Welding Inc., Denver, Colo.) were mixed through two flow meters 3 (Matheson Tri-Gas Inc., Montgomeryville, Pa.) to make the simulated flue gas stream for sorption tests. Water moisture was introduced to the simulated flue gas stream and its concentration was controlled by a syringe pump 4. The tubing from syringe pump 4 to reactor was wrapped with heating tapes 5 (Cole-Parmer Co., Vernon Hills, Ill.) to avoid water vapor condensation. A three-eighth inch quartz tube 6 with a notch in it was used as the sorption-desorption reactor. Two pieces of quartz wool 7, 9 were placed at the two sides of the sorbent bed 8 to hold sorbent during sorption and sorbent regeneration. Sorption temperatures in the reactor were controlled by a F21135 tube furnace 10 (Barnstead International, Dubuque, Iowa). The water in the post-adsorption gas steam was eliminated by a water removal unit 11 prior to $CO_2$ analysis. The $CO_2$ concentration of the inlet/outlet gas stream was measured by a ZRE infrared gas analyzer 12 (Fuji Electric System Co. Ltd., Tokyo, Japan), and the sorption and desorption data were collected with a DataChart 3000 recorder 13 (Monarch Instrument Inc., Amherst, N.H.).

II. Results and Discussion

A. Factors Affecting $Co_2$ Sorption

1. Dispersion of $K_2CO_3$ on Nanoporous FeOOH

Impregnating an active compound onto the surface of a porous matrix can improve the sorption capacity and selectivity of a sorbent for a targeted pollutant or contaminant. Hayashi et al. showed that the $CO_2$ sorption capacities of the supported $K_2CO_3$ sorbents are closely related to the characteristics of the support matrixes and the distributions of potassium carbonate on the surfaces of the porous matrixes. (Hayashi, H.; Taniuchi, J.; Furuyashiki, N.; Sugiyama, S.; Hirano, S.; Shigemoto, N.; Nonaka, T. *Ind. Eng. Chem. Res.* 1998, 37, (1), 185-191). Good supporting materials should not only possess large surface areas but also large pore volumes, both of which are prerequisites for preparation of high-capacity $CO_2$ sorbents. (Zhao, C.; Chen, X.; Zhao, C. *Ind. Eng. Chem. Res.* 2010, 49, (33)). The supporting material used for this research, FeOOH, is inexpensive, granular, highly porous, mechanically strong, and widely available. It has extremely large BET (Brunauer, Emmet, and Teller) surface area (~200 m²/g) compared to other inorganic counterparts.

Figure 2:
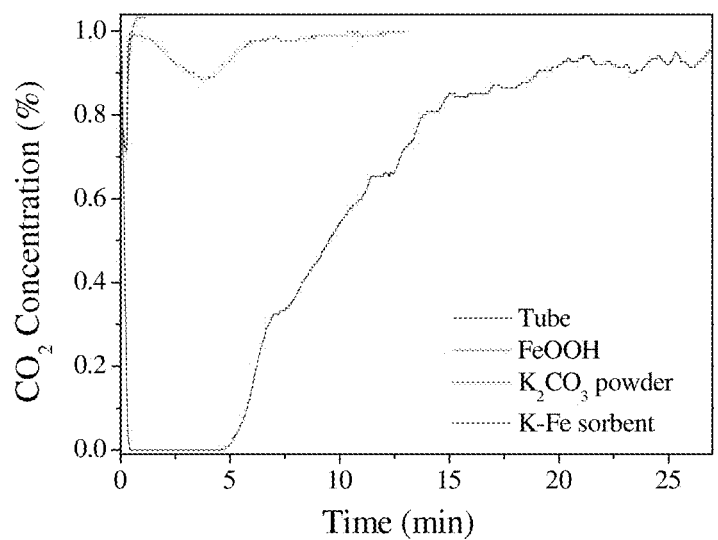
FIG. 2 is a graph of typical $CO_2$ sorption curves of blank tube and different solids ($CO_2$: 1 vol-%; H2O: 10 vol-%; gas flow rate: 0.3 L/min; sorption temperature: 60° C.; weight of pure $K_2CO_3$ or K—Fe sorbent: 1 g).

The sorption tests of blank reactor, pure FeOOH (supporting material), $K_2CO_3$ powder, and the K—Fe sorbent were run to check the degrees to which they adsorb $CO_2$. The test results are shown in FIG. 2. Obviously, the sorption capacities of blank reactor and pure FeOOH are negligible compared to that of $K_2CO_3$ powder, especially that of the K—Fe sorbent.

The maximum $CO_2$ sorption efficiency of pure $K_2CO_3$ powder is only about 15% while K—Fe-sorbent can achieve as high as a 100% $CO_2$ sorption efficiency.

The total carbon dioxide sorption capacities of those four solids are calculated based on their sorption profiles, and listed in Table 1.

TABLE 1

Comparison of blank reactor, pure FeOOH and $K_2CO$, and synthesized K—Fe sorbent in $CO_2$ adsorption ($CO_2$: 1 vol-%; $H_2O$: 10 vol-%; gas flow rate: 0.3 L/min; sorption temperature: 60° C.; weight of pure $K_2CO_3$ or K—Fe sorbent: 1 g)

| Solids | $CO_2$ sorption capacity (mg $CO_2$/g-sorbent) | percentage of reacted $K_2CO_3$ (%) |
|---|---|---|
| Tube reactor | 0 | — |
| FeOOH* | 0.16 ± 0.02 | — |
| $K_2CO_3$* | 2.01 ± 0.42 | 0.57 ± 0.12 |
| K—Fe sorbent** | 49.20 ± 3.96 | 46.83 ± 3.77 |

Figure 3A:
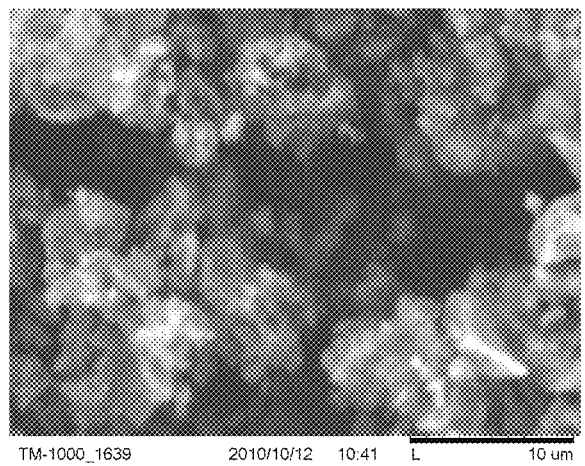
FIGS. 3A and 3B are SEM images of FeOOH (A) and the synthesized K—Fe sorbent (B) at a magnification of 6000.
Figure 3B:
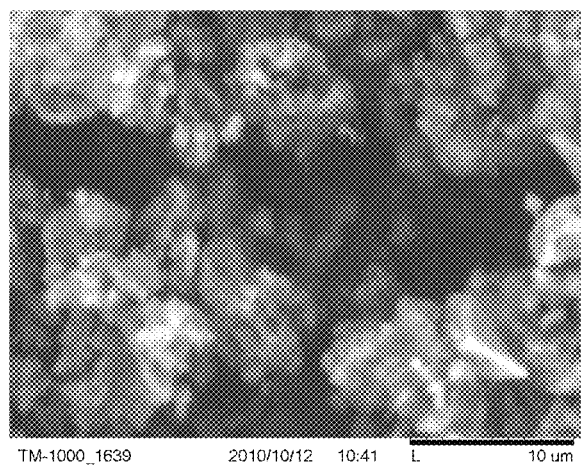

The total $CO_2$ sorption capability is defined as the amount of $CO_2$ adsorbed per gram of $K_2CO_3$ powder or K—Fe sorbent from a gas stream until the carbon dioxide concentration in the outlet gas stream reaches 1 vol-% of the inlet or initial $CO_2$ concentration of the simulated flue gas stream. The supporting material, raw FeOOH, has almost no $CO_2$ adsorption even though it has a similar pore structure to that of the modified FeOOH or the FeOOH loaded with $K_2CO_3$ or the K—Fe sorbent as shown in FIGS. 3A and 3B. The sorption capability of $K_2CO_3$ powder is only 2.0 mg $CO_2$/g-$K_2CO_3$ under the given experimental conditions. However, the $CO_2$ sorption capacity of the K—Fe sorbent is 49 mg $CO_2$/g-sorbent, about seventy times higher than that of $K_2CO_3$ powder. Therefore, dispersing $K_2CO_3$ onto the surface of the porous supporting material FeOOH leads to dramatic improvement of $CO_2$ sorption due to the high accessibility of potassium carbonate on the surface of nanoporous FeOOH.

Figure 4:
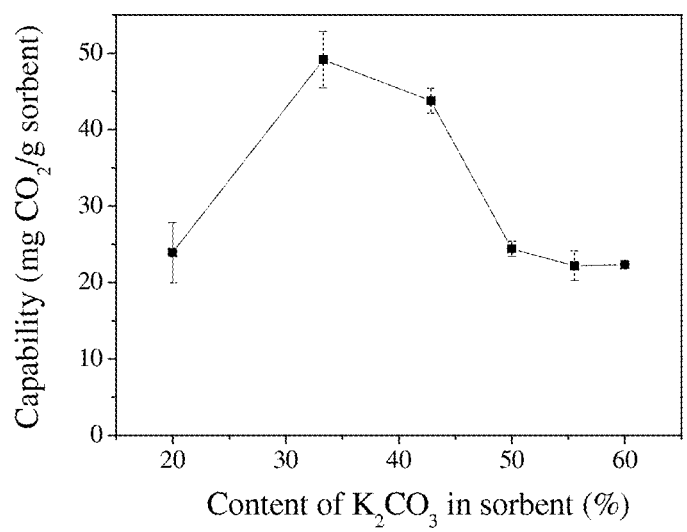
FIG. 4 is a graph showing the effect of $K_2CO_3$ content in K—Fe sorbent on $CO_2$ sorption capability. Conditions ($CO_2$: 1 vol-%; H2O: 10 vol-%; gas flow rate: 0.3 L/min; sorption temperature: 60° C.; weight of K—Fe sorbent: 1 g).

The effect of the loading amount of $K_2CO_3$ on the surface of FeOOH on total $CO_2$ sorption capacity of the finished K—Fe sorbent can be observed in FIG. 4. The capability of K—Fe sorbent reaches its peak when the loading amount of $K_2CO_3$ is 33.3 wt-% of the K—Fe sorbent under the given experimental conditions. Without being limited, one theory is that overdoing $K_2CO_3$ on FeOOH affects the pore structure of the finished K—Fe sorbent and consequently reduces the accessibility of $K_2CO_3$ and thus $CO_2$ sorption efficiency as well as total $CO_2$ sorption capacity.

2. $H_2O$ Concentration

Moisture, usually present in the actual flue gases, can be as high as 8-17 vol-% varying from one power plant to another. It often has negative effects on the $CO_2$ sorption capacities of conventional sorbents such as zeolites, silica and molecular sieves.

However, unlike most of the conventional solid $CO_2$ sorbents the K—Fe sorbent needs an adequate amount of water for its efficient $CO_2$ adsorption as demonstrated in the following sorption reaction

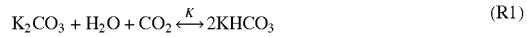

Figure 5:
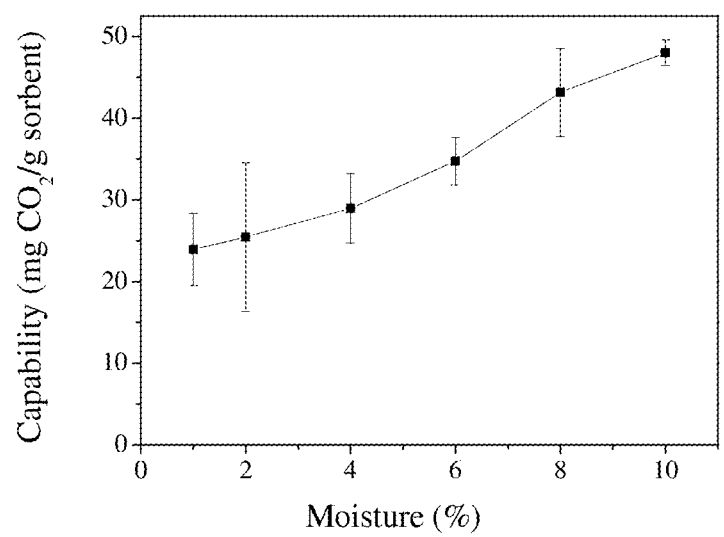
FIG. 5 is a graph showing the change of $CO_2$ sorption capacities with $H_2O$ concentration ($CO_2$: 1 vol-%; gas flow rate: 0.3 L/min; sorption temperature: 60° C.; weight of K—Fe sorbent: 1 g).

(R1)

where K is the sorption equilibrium constant of R1 under certain conditions. According to stoichiometry, one mole of $K_2CO_3$ can react with one mole of $CO_2$ and one mole of $H_2O$ to form two moles of $KHCO_3$. FIG. 5 shows that the total $CO_2$ sorption capability increases from 24 mg $CO_2$/g-sorbent to 49 mg $CO_2$/g-sorbent when water concentration increases from 1 to 10 vol-%, which means that water can enhance $CO_2$ sorption considerably. The fact can be explained by looking into the possible pathways of R1 as shown below $$CO_2 + H_2O \longleftrightarrow H^+ + HCO_3^- \quad (R2)$$

$$K_2CO_3 \xrightarrow{H_2O} 2K^+ + CO_3^{2-} \quad (R3)$$

$$H^+ + CO_3^{2-} \longleftrightarrow HCO_3^- \quad (R4)$$

$$2K^+ + 2HCO_3^- \longleftrightarrow 2KHCO_3. \quad (R5)$$

R1 and R2 show that the presence of $H_2O$ is necessary for the subsequent occurrences of R4 and R5. Considering the fact that $H_2O$ has low $CO_2$ dissolving ability and $K_2CO_3$ is a strong-base but weak-acid salt, it is easy to imagine that $H_2O$ plays a very important role in the overall $CO_2$ adsorption performance of the K—Fe sorbent. More water leads to more $CO_2$ to dissolve and thus generate more $H^+$ and $HCO_3^-$ which subsequently combines with $K^+$ to form more adsorption product, $KHCO_3$. An adequate amount of water is also necessary for the disassociation of $K_2CO_3$ into $CO_3^{2-}$ and $K^+$, which are the reacting species of R4 and R5, respectively.

Figure 6A:
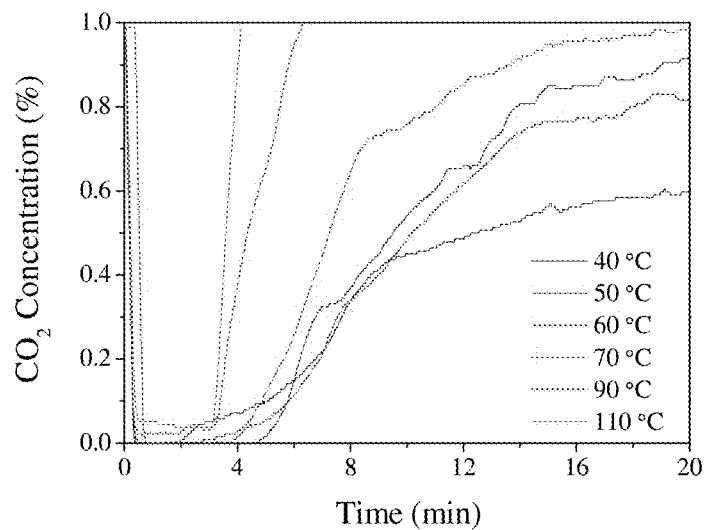
FIG. 6 is a graph showing the effect of temperature on $CO_2$ sorption capacity (A: sorption profiles; B: sorption capacities; $CO_2$: 1 vol-%; H2O: 10 vol-%; gas flow rate: 0.3 L/min; weight of K—Fe sorbent).
Figure 6B:
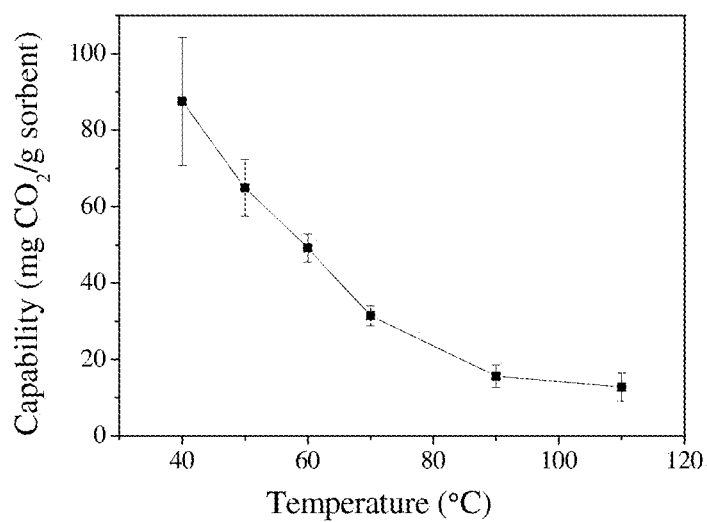
Figure 7:
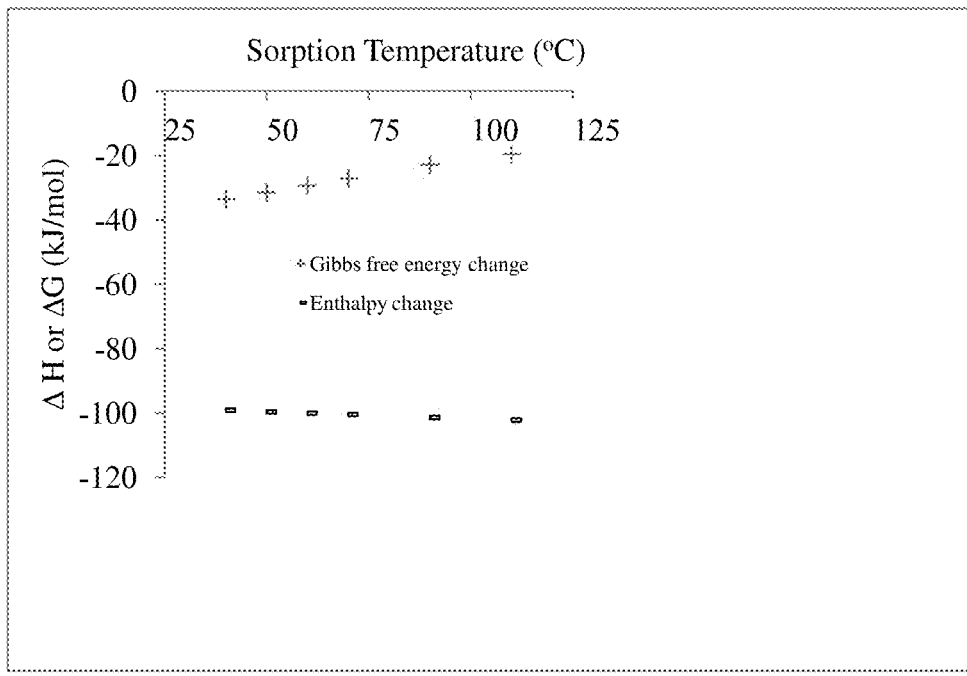
FIG. 7 is a graph of the calculated Gibbs free energy and enthalpy changes of $CO_2$ sorption reaction with temperature.
Figure 8:
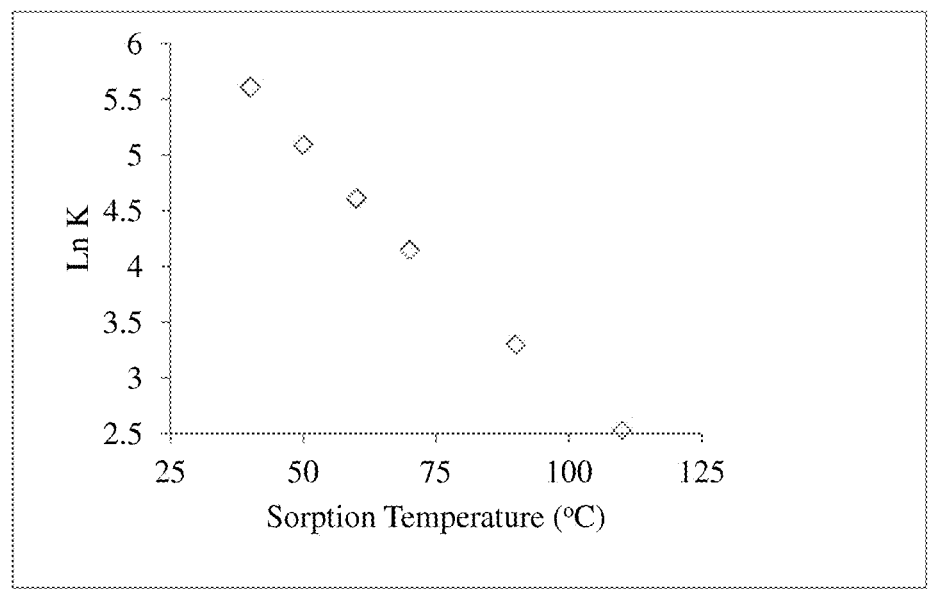
FIG. 8 is a graph of the calculated equilibrium constants of $CO_2$ sorption reaction at different temperatures.

3. Sorption Temperature $CO_2$ adsorption tests were conducted in the temperature range of 40-110° C. to assess the effect of temperature on the total $CO_2$ capture capability of the K—Fe sorbent. The sorption profiles and the corresponding $CO_2$ sorption capacities of the sorbent at different temperatures are presented in FIGS. 6A and 6B, respectively. $CO_2$ sorption capability decreases considerably with the increase of adsorption temperature. The total $CO_2$ capture capability drops from ~88 mg $CO_2$/g-sorbent (very close to the theoretical $CO_2$ adsorption capacity in term of $K_2CO_3$ loaded per gram of sorbent) to 13 mg $CO_2$/g-sorbent when sorption temperature increases from 40° C. to 110° C. The change trend is consistent with what is predicted by thermodynamic theory. The Gibbs free energy and enthalpy changes of the sorption reaction R1 within the sorption temperature range are calculated and presented in FIG. 7. From FIG. 7 it is seen that the sorption reaction is exothermic and $\Delta H_{R1}$ becomes more negative with the increase of temperature while $\Delta G_{R1}$ considerably increases with the temperature even though its values are still negative within the sorption temperature range. Based on $$\Delta G = -RTLnK \quad (E1)$$

the LnK and sorption temperature relationships are calculated and presented in FIG. 8. It is clear that K values decrease and the $CO_2$ partial pressures ($p_{CO_2}$) at equilibrium increase dramatically with the elevation of sorption temperatures due to $$K = p_{CO_2}^{-1} \quad (E2)$$

as expected. Therefore, the sorbent experiences a large decrease in the $CO_2$ sorption capacity when sorption temperature increases from 40° C. to 110° C.

Catalytic $CO_2$ Desorption and Sorbent Regeneration

An ideal sorbent should not only have high mechanical strength, activity, selectivity and sorption capacity but also be regenerable for multicycle uses in a fixed-bed or fluidized bed reactor. The multicycle $CO_2$ capture capacities of the sorbents of the present invention at two different regeneration temperatures (125° C. and 150° C.) were evaluated and the results are shown in FIG. 9.

Figure 9:
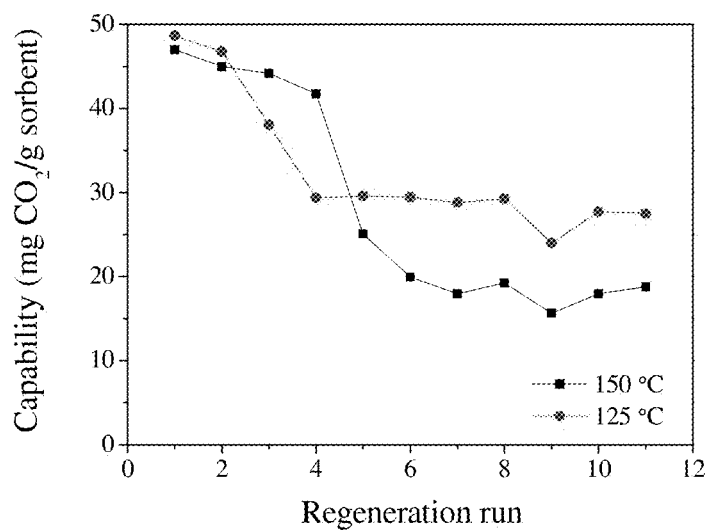
FIG. 9 is a graph of the multicycle use of 1 g sorbent for $CO_2$ sorption-desorption at two different desorption temperatures (sorption condition—$CO_2$: 1 vol-%; gas flow rate: 0.3 L/min; sorption temperature: 60° C.; sorbent regeneration conditions—temperature: 125 or 150° C.; time: 2 hrs; $N_2$ flow rate: 0.5 L/min).

Three major facts are observed in FIG. 9. The first one is that the sorption capabilities of the sorbent decease gradually in the first few sorption-desorption cycles at both regeneration temperatures (125° C. and 150° C.) until they reach stable levels. XRD studies were conducted to understand the causes of the initial drops. The XRD images of both fresh and spent sorbents show similar structures, which are largely amorphous with small traces of crystalloids. In other words, no new species or structures are observed on the surface of the regenerated sorbent.

Another observed fact is that the sorbent is completely regenerable even at 125° C. and demonstrates the constant sorption capacity as shown in FIG. 9, which indicates that the nanoporous FeOOH may not only function as a good $K_2CO_3$ supporting material for synthesis of the K—Fe sorbent but also as a catalyst for $CO_2$ desorption during spent sorbent regeneration process since according to Lee the $KHCO_3$ decomposition reaction at 125° C. even at 150° C. should be very slow. (Lee, K. S.; Kim, I. W. *J. Phys. Soc. Jpn.* 2001, 70, (12), 3581-3584). The activation energy of $KHCO_3$ decomposition is as high as 92.5 kJ/mol. (Tanaka, H. *Journal Therm. Anal* 1987, 32, (2), 521-526). Therefore, catalysis must exist during the $CO_2$ desorption from the surface of the spent K—Fe sorbent. According to the Arrhenius equation $$k_{KHCO_3\text{-}decompoistion} = A * e^{-E/RT} \quad (E3)$$

where $k_{KHCO_3\text{-}decomposition}$ is the apparent $CO_2$ the desorption rate constant, A represents the pre-exponential factor, R denotes 8.314 (J·K$^{-1}$·mol$^{-1}$), E is activation energy (J·mol$^{-1}$), and T is the reaction temperature (K), increasing A and decreasing E are the only two ways to increase $k_{KHCO_3\text{-}decomposition}$ or improve $CO_2$ desorption kinetics that can be realized by using nanoporous FeOOH in this research. Compared to conventional solid supporting materials, nanoporous FeOOH, on which nucleate $KHCO_3$ resulting from $CO_2$ adsorption disperses, could provide much more contact opportunities for $KHCO_3$ molecules on the surface of the spent sorbent, thus significantly increasing the pre-exponential factor (A) in E3. Furthermore, nanoporous FeOOH is well known for its abilities in reducing activation energy required for various reactions. It is reasonable to assume that nanoporous FeOOH could reduce the activation energy of $KHCO_3$ decomposition by 3-15%. Based on the reported E for $KHCO_3$ decomposition and the assumed activation energy reduction percentages of FeOOH, 3-15%, the potential increase ratios of the $KHCO_3$ decomposition rate constant ($k_{KHCO_3\text{-}decomposition}$) in E3 at 398 K (125° C.) due to the use of the FeOOH and thus the reduction of E are estimated and shown in Table 2.

TABLE 2

Catalytic effect of FeOOH on $KHCO_3$ decomposition rate constants due to its potential in reducing the reaction's activation energy

| | m (%) | 3 | 6 | 9 | 12 | 15 |
|---|---|---|---|---|---|---|
| $e^{\frac{E_{with-FeOOH}}{RT_{KHCO_3-decomposition}}} \Big/ e^{\frac{E_{without-FeOOH}}{RT_{KHCO_3-decomposition}}}$ | | 2.3 | 5.4 | 12.4 | 28.6 | 66.2 |

*Note: $E_{with-FeOOH}$ = (100%-m) *$E_{without-FeOOH}$; m is the assumed reduction percentage of the reported activation energy of $CO_2$ decomposition, 92.5 (kJ/mol) (Tanaka et al., 1987); $T_{KHCO_3-decomposition}$ = 398K.

It is clear that the importance of FeOOH as a catalyst in $CO_2$ desorption could not be neglected since it could significantly accelerate the decomposition of $KHCO_3$ even when it only reduces the activation energy of $CO_2$ desorption reaction by 5%.

FeOOH is well known for its strong abilities in physicochemical complexion within aqueous environment with anions such as $H_2AsO_4^-$, which is the basis for its wide application in water and wastewater treatment. The reverse reaction of R4 or the disassociation of $HCO_3^-$ within an alkaline environment is not an easy one but, without the help of catalysts, it is one of the necessary steps in overall $CO_2$ desorption process. The use of FeOOH with huge Lewis acid sites could lead to a different $HCO_3^-$ disassociation or $CO_2$ desorption pathway since FeOOH can complex with $HCO_3^-$ (a Lewis base) and then dissociate it into $CO_2$ and $OH^-$. The resultant $OH^-$ can then easily combine with the $H^-$ on the left side of R4 to accelerate the shift of R4 towards its left side according to Le Châtelier's principle, and thus accelerate overall $CO_2$ desorption process.

The last phenomenon demonstrated in FIG. 9 is that the sorbent has better multicycle performance at 125° C. than at 150° C. since the stable $CO_2$ sorption capacity at 125° C. is ~30 mg/g-sorbent, about a 50% increase compared to that at 150° C. The rate law needs to be resorted to explain the phenomenon. Assuming that the decomposition rate ($r_{KHCO_3\text{-}decomposition}$) of $KHCO_3$ can be expressed as $$r_{KHCO_3\text{-}decomposition} = k_{KHCO_3\text{-}decomposition} C_{KHCO_3}{}^{n_{KHCO_3}} \quad (E4)$$

where $C_{KHCO_3}$ is the mole concentration of $KHCO_3$ on FeOOH (mol-$KHCO_3$/m²-FeOOH), $n_{KHCO_3}$ is the apparent $CO_2$ desorption reaction order with respect to $KHCO_3$. The difference can be attributed to the variations of between $r_{KHCO_3\text{-}decomposition,125°\,C.}$ and $r_{KHCO_3 decomposition,150°\,C.}$ can be attributed to the variations of $k_{KHCO_3\text{-}decomposition}$ and $n_{KHCO_3\text{-}decomposition}$ with temperature. $KHCO_3$ decomposition is a multistep heterogeneous reaction process and $k_{KHCO_3\text{-}decomposition}$ is mainly determined by the rate controlling step. The adsorption of $HCO_3^-$ on FeOOH surface should be the slowest step and is weaker at 150° C. than at 125° C., possibly leading to $k_{KHCO_3\text{-}decomposition,125°\,C.} > k_{KHCO_3\text{-}decomposition,150°\,C.}$, which partially contributes to the fact that the $KHCO_3$ decomposition rate or the quantity of the desorbed $CO_2$ or the multicycle $CO_2$ sorption capacity at the regeneration temperature of 125° C. is higher than that at 150° C. as shown in FIG. 9. The value of $n_{KHCO_3}$ may also change with temperature since the formation and growth of nuclei of $K_2CO_3$ during $KHCO_3$ decomposition or $CO_2$ desorption process are, according to Lee, et al. (2001) and Tanaka, et al, (1987), very complicated and due to the fact that part of $KHCO_3$ exists in its dimeric form. Phase change within the dimer occurs along with the thermal decomposition of $KHCO_3$. The migration of the protons within the dimer in forms of intrabond and interbond jumps can be significantly affected by temperature and the structure of the surface on which the dimer stays. The undersaturation of the coordination environment of oxygen, hydroxyl bonds and hydrogen bonds in the FeOOH structure make it highly affinitive to protons in the dimer. With these factors considered, $n_{KHCO_3,125°\,C.}$ might be larger than $n_{KHCO_3,150°\,C.}$, which can also partially explain why the $KHCO_3$ decomposition rate or the quantity of the desorbed $CO_2$ or the multicycle $CO_2$ sorption capacity at the regeneration temperature of 125° C. is higher than that at 150° C. as shown in FIG. 9.

Solid sorbents containing alkali or alkali earth metals for $CO_2$ adsorption have been frequently reported and recommended to be used for $CO_2$ separation due to their low prices and wide availabilities, and among them is CaO. However, the reaction between CaO and $CO_2$ is a very slow one at low temperature and usually needs to be operated at 500-600° C. and regenerated at temperatures higher than 850° C. (Abu-Zahra, M. R. M.; Schneiders, L. H. J.; Niederer, J. P. M.; Feron, P. H. M.; Versteeg, G. F. *Int. J. Greenhouse Gas Control* 2007, 1, (1), 37-46). The robust K—Fe sorbent synthesized in this research can effectively adsorb $CO_2$ at temperatures in the range of 50-70° C. in the presence of moisture, which matches the conditions of flue gases in power plants, and can be generated at 125° C., which is achievable with the heat of waste gases in power plants. Therefore, the K—Fe sorbent is superior to Ca and Mg based solid sorbents from the viewpoints of $CO_2$ sorption-desorption operation optimization and waste heat recovery viewpoints.

Compared to most of the recently reported solid $CO_2$ sorbents based on organic compounds, the unit $CO_2$ sorption capacity of the K—Fe sorbent is lower. However, the preparation process of the K—Fe sorbent is simple and only needs two stable and inexpensive inorganic compounds, $K_2CO_3$ and FeOOH, while organic sorbents are synthesized with much more expensive materials and require the use of a lot of solvents during their preparation processes.

Sorbent Size and Pressure Drop

In addition to $CO_2$ desorption or spent sorbent regeneration, another major factor affecting solid sorbent based $CO_2$ separation energy consumption is pressure drop in the sorbent bed. Pressure drops are considerably affected by the size of K—Fe sorbent and can be estimated using the below Ergun's equation $$150 \times \frac{(1-\varepsilon)^2}{\varepsilon^3} \frac{\mu}{d_p^2} u + 1.75 \frac{1-\varepsilon}{\varepsilon^3} \frac{\rho}{d_p} u^2. \quad \text{E5}$$

Figure 10:
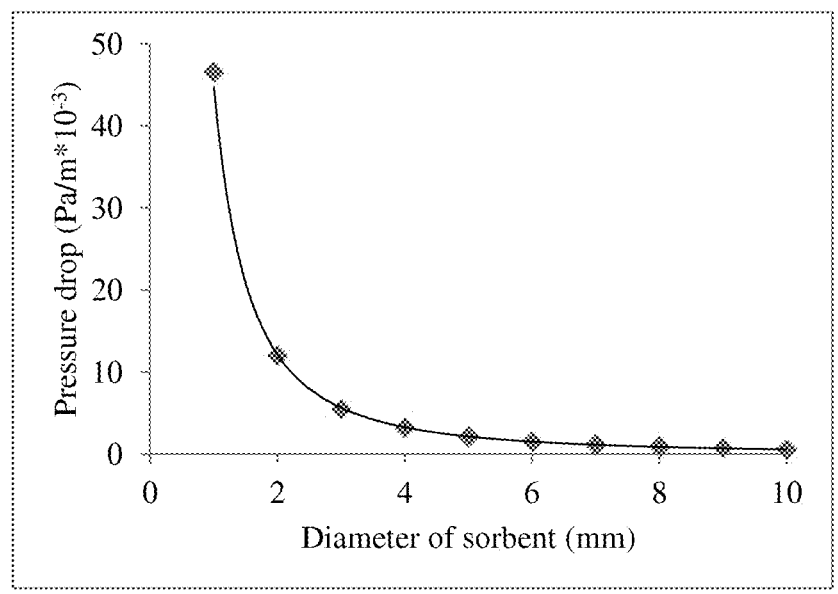
FIG. 10 is a graph of the relationship between K—Fe sorbent size and pressure drop predicted with Ergun's law.

The characteristics of the K—Fe sorbent, the properties of flue gas and the desired configuration of the $CO_2$ adsorber allow us to assume that the interparticle porosity ($\varepsilon$) of the $CO_2$ sorption bed (fixed bed) is 0.6, flue gas viscosity ($\mu$) is $5.4 \times 10^{-4}$ kg/ms, interstitial velocity (u) is 0.75 m/s, and density of flue gas ($\rho$) is 0.85 kg/m³. Based on Ergun's law and the chosen parameters, the variations of pressure drop of flue gas stream in the fixed K—Fe sorbent bed with the diameters of the sorbent when the K—Fe sorbent is applied in power plants are predicated and presented in FIG. 10. FIG. 10 indicates that when a 10 m long, fixed-bed adsorber loaded with 5 mm K—Fe sorbents is constructed under the given conditions for $CO_2$ separation the total pressure drop of the flue gas during its passing the sorbent bed is only about 0.21 atm. Therefore, there is no need for a powerful blower to overcome the pressure drop of flue gas when the size of K—Fe sorbent is reasonably large. Finally, it should be mentioned that the K—Fe sorbent can not only be used in conventional fixed bed and radial flow fixed bed adsorbers but also in fluidized bed adsorbers due to its good mechanical properties.

III. Conclusions

The K—Fe-based sorbent synthesized with two widely available and low-priced materials can achieve high $CO_2$ sorption efficiency, is regenerable, and has good $CO_2$ sorption capacity. The catalytic function of the supporting material, FeOOH, could help reduce the energy consumption needed for $CO_2$ sorption. The inherent characteristics of the inorganic sorbent leads to low energy demand for overcoming the pressure drop of flue gas passing through the sorbent bed. Therefore, the K—Fe sorbent is promising since it can be potentially used for cost-effective $CO_2$ separation.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

We claim:

1. A sorbent for $CO_2$, comprising $K_2CO_3$ supported on nanoporous FeOOH.

2. A method of forming a sorbent for $CO_2$, comprising the steps of combining nanoporous FeOOH with a solution of $K_2CO_3$, stirring to coat the nanoporous FeOOH with the $K_2CO_3$ and drying.

3. A method of removing $CO_2$ from a gas stream, comprising the step of passing the gas stream over a sorbent comprising $K_2CO_3$ supported on nanoporous FeOOH.

4. The method of claim 3, wherein the gas stream is passed over the sorbent in a fixed bed reactor.

* * * * *